J. H. ALLIN.
COMBINATION SHAFTS.
APPLICATION FILED MAR. 25, 1909. RENEWED APR. 3, 1912.
1,046,534.
Patented Dec. 10, 1912.
2 SHEETS—SHEET 1.
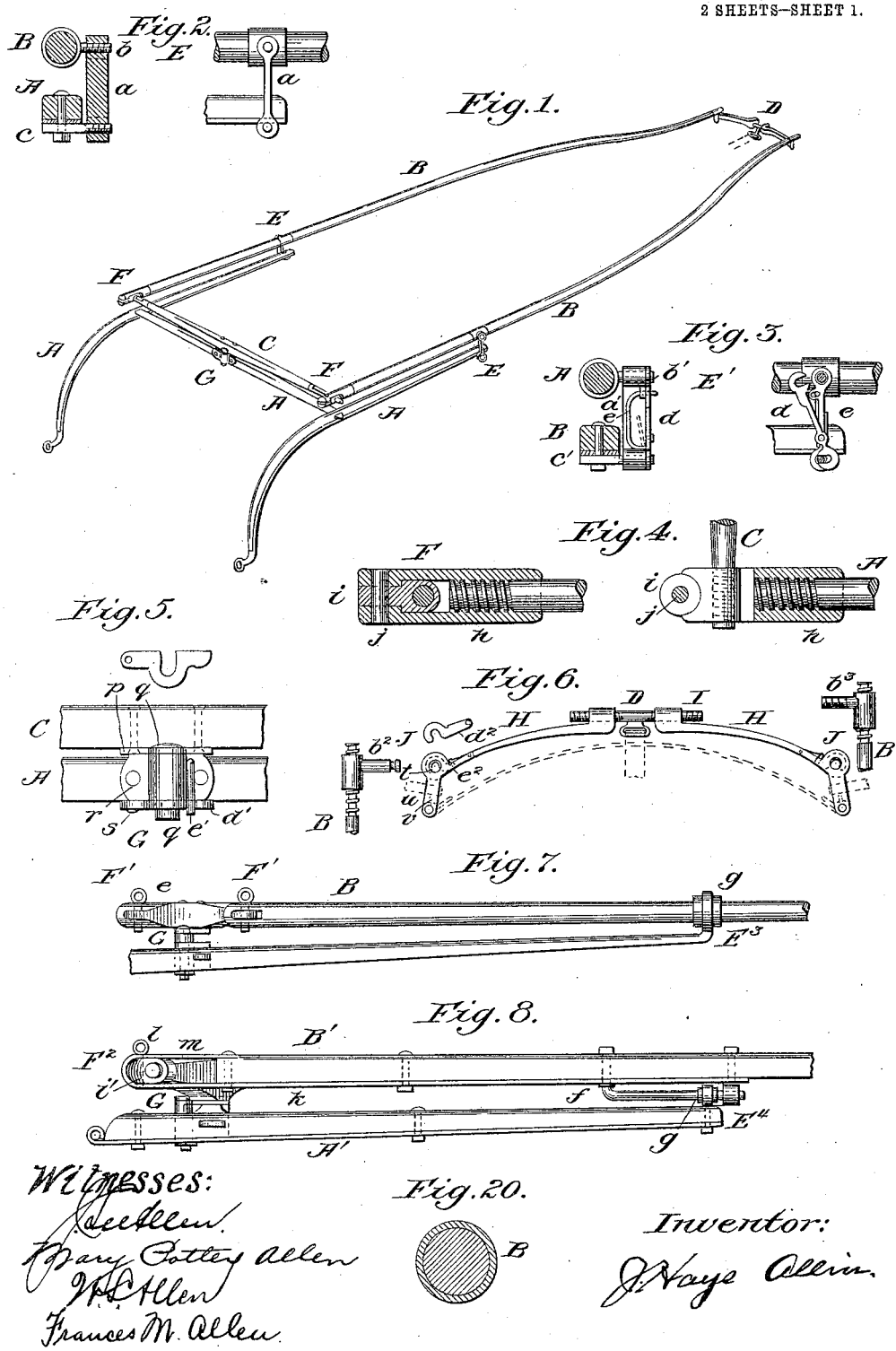
Witnesses:
Inventor:
J. Haye Allin

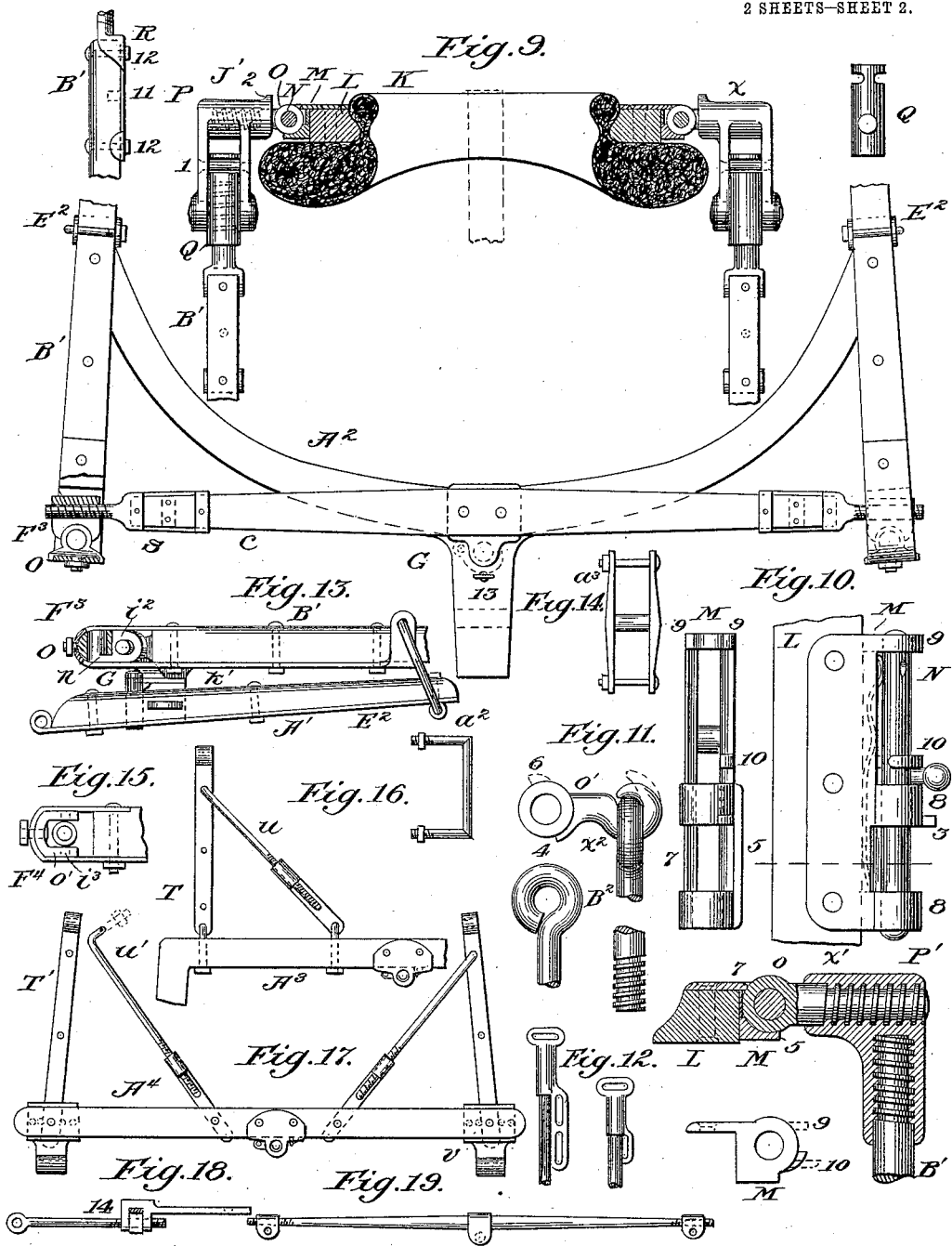

UNITED STATES PATENT OFFICE.

JAMES HAYS ALLIN, OF EAST CHATTANOOGA, TENNESSEE.

COMBINATION-SHAFTS.

1,046,534. Specification of Letters Patent. Patented Dec. 10, 1912.

Application filed March 25, 1909, Serial No. 485,854. Renewed April 3, 1912. Serial No. 688,254.

*To all whom it may concern:*

Be it known that I, JAMES HAYS ALLIN, a citizen of the United States, residing at East Chattanooga, in the county of Hamilton and State of Tennessee, have invented certain new and useful Combination-Shafts, of which the following is a specification.

The invention relates to new and useful combination shafts; and consists generally and substantially of the usual styles of common commercial shafts with their forward arm portions severed from the rear or yoke portion thereof and converted into combination shaft trace elements by being lapped backwardly and connected with the ends of the cross-bar yoke and whiffletree respectively, and made movable endwise like other traces relative to the said yoke and with the whiffletree. And preferably for best results, provision is made for the tips of the shafts to be hingedly connected together by a substantial whiffle-breast-yoke element. The connecting arrangements are such that the whiffletree and the shaft traces and the breast yoke element may all unitedly and harmoniously vibrate forward and back together relative to the cross-bar yoke; while the cross-bar yoke itself remains fixed in its relations to the vehicle, other than to provide for the usual up and down movement of the shafts. Thus these elements all vitally and harmoniously combine for the draft, guidance and control of the vehicle.

It is obvious that the shafts may be carried in the usual way by the back and belly bands; not only imperfectly so, as the guiding strain may fall more severely upon one shaft trace than upon the other. I therefore preferably make special provision for attaching and carrying the shafts, and for firmly hinging them together, at the shoulder, both in breast and collar harness. Thus connected together, the two shaft traces substantially constitute but a single guiding element. And it is obvious that with such an adjustment much lighter shaft trace elements may be used and also much better control of the vehicle secured. Indeed, the invention provides that the vehicle may be perfectly controlled from the tips of the shafts precisely as is universally done in pole or two-horse vehicles. This is a vital primary object of the invention.

As the two-horse or pole rig provides a breast yoke evener to vibrate upon and hold back by the end of the pushing pole between the two animals, so, for the same and kindred reasons and purposes, this invention also, preferably provides a whiffle-breast-yoke element to vibrate upon and hold back by the choke or pole strap between the two ends of the pushing shafts; and as is clearly indicated in Figs. 1, 6 and 9. The arrangement, though reversely disposed, is practically, if not precisely, the same as is commonly provided for in pole or double rigs. And, hence, for breast harness special provision is made for a whiffle breast yoke, to the center of which the usual hold down and hold back choke or pole strap may be attached and become the only hold down and hold back means necessary.

It is thought that the rear end of the choke strap attached to the belly-band will prove ample hold down and hold back means for buggies and other light rigs, the same as is common in corresponding double rigs. But the common hip breeching passing from above the hips down and around the sides of the animal and united with the said choke or pole strap at or near the belly band may be used for either light or heavy rigs the same as is common in double or pole rigs. It is worthy of note, however, that this last named breeching is free from frictional contact with the muscular stepping movements of the animal. Moreover, the common pole or choke strap rear breeching may be used at pleasure precisely the same as is common in double rigs. It will be observed, however, that in either of the two latter cases, the back and belly-bands may be entirely dispensed with. However, the usual rear breeching may be used and secured directly to the sides of the shaft traces the same as is done with common shafts. But it must be observed that these shaft traces may freely vibrate in response to the rear stepping movements of the animal in holding back, precisely as they do to the shoulder movements in forward draft. Hence the invention is decidedly humane in protecting the draft animal from the usual rear friction in holding back. Again, for best results, these shaft traces should lie close to the shoulders like other traces, and yet should be stayed apart to prevent undue clamping of the shoulders in holding back, as well as to prevent undue and injurious side clamping of the flexible joints of the trace elements. The whiffle breast-yoke element, herein provided for, perfectly meets such requirements in addition to its said choke strap hold-down, hold-back and vibrating features. Thus connected, the shaft traces may at all times freely respond to the shoulder movements. In hames and collar harness the hames and collar are preferably made to constitute and act as the breast yoke element by properly hinging the shaft trace elements directly thereto. And preferably to better meet the said hold back features, provision is also made by a joint in the shaft, for rockingly hinging the shafts to the harness with upward and forward restrictions; thereby to lower the shafts in holding back to press more nearly in alinement with the choke-strap connection at the bottom of the collar; as well as to relieve the stiffness of the trace element in the shaft.

It seems evident that some means should be provided for graduating the distance between the tips of the shafts; and to this end, as well as to provide a more durable draft element, I provide a whiffle-tree screw threaded at its ends for pivotal engagement with a socketed draft device carried by the shaft trace, and as hereinafter more fully set forth. By threading the ends of the whiffle-tree right and left the tree may be rotated, and thereby the tips of the shafts be equally and correspondingly drawn toward each other or spread apart without in the least disturbing the straight forward alinement of the guiding elements in the shafts.

It is hoped that small tapering steel rod shaft traces may prove superior and of cheap and easy manufacture with screw threaded bolt-like ends mounted with draft sleeves. And that tubular shafts filled with wood or some composition may also prove superior. The frictional wear falls upon the draft sleeves, and hence the shaft trace is comparatively everlasting.

It is purposed among numerous other objects to cause all parts of these combination shafts to be manufactured as finished articles of commerce, in separate fitted interchangeable parts, such as may be easily and quickly assembled by any ordinary teamster. It is likewise purposed to furnish combination shafts complete.

With these objects in view and referring to the accompanying drawings as a part of this specification, we observe that—

Figure 1 is a perspective view of a device embodying my invention; and Figs. 2, 4, 5 and 6 are detail views of parts thereof, while Figs. 3, 7 and 8 are modifications of parts thereof. Fig. 9 is a top view of a modification of Fig. 1. It shows a collar and hames attached, but broken away above the shaft-trace connections therewith, the shafts broken away centrally, and a detail side view of the tip of the shaft, and of the hinge draft sleeve of said tip. Fig. 10 designates an edge view, a side view, a modified sectional view and an end view of the hame trace connection shown in Fig. 9. Fig. 11 designates a modification of a shaft trace and its connections; the center of the shaft being shown broken away. A side view of the tip of the shaft is also shown. Fig. 12 illustrates two modified shaft tips especially designed for light breast harness; the tips may be longer or shorter to graduate the length of the shaft and may preferably be secured to the shaft by coöperative screw threaded parts, as illustrated in Figs. 9 and 6. Fig. 13 is a modified side view of the rear portion of Fig. 9; it also shows the shaft and cross-bar-yoke connecting device, $a^2$, detached. Fig. 14 illustrates another style, possibly the preferred style, of connecting device for hinging the shaft to the cross-bar yoke. Fig. 15 illustrates a modified form, thought to be the preferred style, of the shaft trace and whiffletree connection shown in Figs. 9 and 13. Figs. 16 and 17 illustrate top views of modified cross-bar yokes of special design for use with either common or combination shafts, and with special provisions for adjusting the distance between the tips of the shafts. Fig. 18 illustrates a modification showing the preferred style of adjusting the length of the arm brace shown in Figs. 16 and 17. Fig. 19 illustrates a whiffle-tree reversely threaded at its ends and adapted for adjusting the length of the tree and for attachment to and detachment from the shaft traces by a rotary movement of the tree itself, and various styles of trace devices may be interchangeably used therewith. And, Fig. 20 illustrates a cross section of a tubular shaft trace, the tube or center of which is shown filled with a wooden shaft, or with some composition, to strengthen the shaft and to prevent the shaft crimping inwardly if bent. The shaft shown in Fig. 1, is designed to represent either a solid or tubular shaft.

Referring to the drawings by letters and figures: Fig. 1 illustrates a pair of combination shafts, in which A designates the cross-bar yoke, B, B, the shaft trace elements; C the whiffletree; D the whiffle-breast-yoke element; and E, E designate the connections by which the shaft traces B, B are secured to and provided endwise movements like other traces relative to the cross-bar yoke, A; F, F designate the whiffletree and shaft trace connections, and G, the whiffletree and cross-bar-yoke connection. Fig. 2 illustrates a cross section and a side view of the said trace and yoke connection E; showing a connecting device, $a$, pivotally engaging the shaft trace projection, $b$, and the yoke tie, $c$, by coöperative screw threaded parts, and showing tie, $c$, pivotally bolted to yoke A, which allows the connecting device, $a$, perfect freedom to hingedly move with the shaft, B. The bolt securing tie c to the yoke also admits of easy detachment. This connection, E, as well as each of the modifications thereof herein shown, is designed to carry the end of the cross-bar-yoke and to control its side movements while allowing the shaft trace element free movement to and fro endwise like other traces relative thereto. It may also serve to adjust the distance between the tips of the shafts.

In Fig. 3, the modification, E', differs in that a locking plate or device, d, and spring latch, e, are introduced for quick and easy assemblance and detachment. The spring latch, e, is shown crossing the connecting device, a', in a groove underlying the locking plate, d, near the pivot which secures the locking plate to the connecting device. The locking end of the spring clamps toward the side of the connecting device, a', and also presses endwise outwardly behind the locking plate, thus serving for both locking and anti-rattle purposes. The end of the shaft trace projection, b', and also of the yoke tie, c', is shown provided with an annular groove into which the corresponding grooves in the respective ends of the locking plate, d, fit with interlocking engagement. In the modification, E², shown in Figs. 9 and 13, the connecting device, a², is shown in substantially double L shape and with its ends parallel and nutted and with the shaft trace and yoke lying between and pivotally secured thereto. And, in Fig. 14, still another modification, a³, is shown, in shape somewhat like the capital H, with a small nutted bolt secured in each end thereof and designed to be used similar to connecting device a². In the modification, E³, of this connection, as illustrated in Fig. 7, provision is shown for the shaft trace element to move to and fro endwise through a sleeve secured to the cross-bar yoke, while in the modification E⁴, thereof, as illustrated in Fig. 8, a rod, f, is shown secured to the shaft trace element for movement to and fro endwise through a sleeve secured to the cross-bar-yoke. Preferably, an inner sleeve, g, is provided of Babbitt metal or some other material to receive and lessen the frictional wear, as well as to avoid metallic sound.

In Fig. 4 a side view, in section, and a top view partly in section, of the whiffletree and shaft trace connection, F, is shown with both laterally and vertically disposed pivotal hinged relations between the shaft trace and the whiffletree; and the same is shown in connections, F², F³ and F⁴ illustrated in Figs. 8, 9, 13 and 15; while connection, F', illustrated in Fig. 7, appears only as a laterally disposed pivotal joint connection. In said connection, F, the shaft trace draft sleeve, h, is shown detachably secured to the shaft by screw-threaded interlocking parts, as in Fig. 4. Sleeve h is also shown transversely slotted with a socketed pivotal portion and a connecting device, i, is shown pivotally secured therein by a pin, j. Said device i, is also shown socketed and pivotally engaging the end of the whiffletree within the socket of draft sleeve, h. The arrangement shown is such that the pin and the said pivotal portion jointly engage the connecting device, i, for draft purposes. In connection, F², of Fig. 8, the connecting device, i', is shown with a round rear end carried within and engaging the circular end of the shaft strap iron, k, thus assisting the thumb bolt, l, by which it is pivoted to the shaft trace as a draft means. The extra thumb bolt sockets, m, designate means for adjusting the length of the shaft by changing the thumb-bolt. The modification shown in connection F³, of Figs. 9 and 13, is quite similar, but shows the connecting device, i², reduced on one side, and carrying a pintle lug portion, n, which pivotally engages a socket therefor in a connecting device, o, which is shown with a bolt rear end securing it to the end of the shaft trace element, k'. Said connecting device, o, is also shown with rearward side jaws designed to assist in securing the same to the shaft trace element. The modification shown in connection F⁴, of Fig. 15, illustrates the connecting device, o', as a U-shaped clevis carrying the connecting device, i³, pivotally secured between the ends of the clevis, and the clevis bolted to the end of the shaft. G designates the connection, illustrated throughout the drawings and shown in detail in Fig. 5, by which, preferably, the tree is shown detachably pivoted to the center of the cross-bar yoke. The draft plate, p, with its pintle, q, which is preferably integral with the plate, is shown secured to the tree; and the draft plate, r, with its socket, engaging and carrying said pintle, q, and its locking plate, d', hinged thereto at s, is shown secured to the center of the cross-bar-yoke. Said plate, r, is also shown carrying a spring latch, e', with the upper end thereof pivoted thereto, and the lower end thereof movable sidewise for securing the locking plate, d', when in locking position. The combination of the connections, E, F and G, with the elements connected thereby, is such as to allow the trace elements in the combination shafts perfect freedom to vibrate or move to and fro endwise like other traces relative to the cross-bar-yoke while preserving the guiding and controlling features to the shaft elements. And the same is true in the modified combinations of these connections found in Figs. 7, 8, 9 and 13.

Fig. 6 illustrates a top view of the whiffle-breast-yoke, D, of Fig. 1, in which are shown, preferably, a pair of breast members, H, H, detachably connected together by a T-shaped choke strap connector I. This connector preferably has its ends screw threaded, the one right and other left, so as to harmoniously adjust the length of the yoke by revolving the connector. J, J, indicate the connections for securing the whiffle-breast-yoke, D, to the shaft trace elements, B, B, and in which the whiffle-breast-yoke, D, is shown provided at each end with a vertically disposed socket, $t$, adapted to receive and pivotally engage a corresponding pivotal projection, $b^2$, on the tip of the shaft trace, B. This projection, $b^2$, may be integral with the shaft trace element, or secured thereto in any desirable manner; but preferably, the shaft tip is shown screw threaded with a screw threaded sleeve thereon, carrying said projection, $b^2$, and having an annular groove therein, as illustrated in side detail. The whiffle-breast-yoke may be pivotally attached to the shaft trace by inserting the projection $b^2$ into said socket, $t$; and it may be detachably secured thereto by means of locking plate $d^2$ and spring latch, $e^2$, which is similar to the locking means shown in Fig. 5. These spring latch locking means may, however, be applied in any suitable or desirable manner. And, when desired, one end of the whiffle-breast-yoke may be permanently pivoted to the shaft; or detachably pivoted thereto by means of screw-threaded parts, as indicated by projection $b^3$, shown in side detail in said Fig. 6; but preferably, as indicated, both ends of the whiffle-breast-yoke should detach from the shaft trace elements for convenience and to allow of better care for the whiffle-yoke; and especially so where the yoke is specially ornamented, or the vehicle is left exposed to the weather. Each end of the whiffle-breast-yoke, D, is also preferably shown with a rearward projection, $u$, formed substantially into a hollow square or loop. To these projections the harness breast and neck-straps may be attached, as indicated by dotted lines. The end of a choke or pole strap is also shown in dotted lines attached to the central projection of the said choke strap connector, I. No other harness attachments are thought to be necessary. And the breast strap may even be but a simple strap secured to and within said loop projection, $u$, by a slight pintle, $v$, through a punched hole in the strap. It is hoped, however, that the whiffle-breast-yoke, when properly shaped and padded to fit the breast and neck, may also serve as the breast element of the harness the same as the shafts combine with and serve as the trace elements of the harness. It must, however, be observed that the whiffle-breast-yoke element may be of most any design or style, provided suitable connections be combined therewith to allow of and provide for the necessary whiffle action thereof relative to and with the shaft trace elements. It is designed that the breast-yoke and the tree harmoniously vibrate together in response to the to and fro endwise movements of the shaft trace elements, which thus move in response to the stepping limb movements of the draft animal.

Fig. 9 illustrates the use of the collar and hames, as the breast-yoke element of the invention. The breast yoke element functions being added to or combined with the trace functions of the collar and hames by hinging the shaft traces directly thereto. This hames-shaft-trace connection, X, is shown in said Fig. 9, in which the collar, K, hames, L, hames plate M, and bolt, N, are also shown broken away above the hames trace connector, O, the compound hinge connector, P, is also shown hinged to the shaft tip sleeve, Q, with upward hinge action restricted by cross pin or bolt, 1, and forward hinge action restricted by lug, 2 of connector P, engaging lug 3, of the hames plate, M, broken away here, but shown in Fig. 10. Shaft B' is shown pivotally secured to draft sleeve Q, by screw threads and compound hinge connector P is also shown pivotally screwed to the hames trace connector, O, by screw threads; and hames trace connector O is shown pivotally and detachably secured to hames plate, M, between draft eyes, 8, by thumb bolt N. The arrangement is such preferably, that three separate and distinct pivotal joints, each transversely disposed to each of the other two, combine and constitute but the one shaft trace and hames connection. This triple pivotal jointed combination connection, X, is also shown in section thereof, $x'$, and in which the double-jointed hinge sections, P and Q, are omitted, and hinge connector P' substituted therefor. By this triple pivotal jointed combination every possible necessary movement of the hames and collar relative to the shaft trace element is fully provided for. And connection $X^2$ in Fig. 11 illustrates still another modification of substantially the same triple jointed combination. In this connection $X^2$, one of the pivotal joints is shown removed to the rear end of the shaft. The central portion of the shaft being shown broken away. A side view of the front end of the shaft $B^2$, is shown; and the hames trace connector, O', is shown with a lug, 4, designed to restrict the connector in its rearward relations, by engagement with the corresponding underlying edge of the hames plate, as at 5. A similar restricting lug 6 is shown above in dotted lines for engagement with the top of the plate, as at 7, to restrict the forward movement of the connector when or if found desirable. The compound hinge feature in the hame-shaft connection, X, shown in Fig. 9, does not affect the functions of said triple-jointed connection, but simply provides for hingedly lowering the end of the shaft in holding back, to bring the hold back pressure thereof nearer the hold back choke strap connection with the bottom of the collar. Said hames plate M, shown in Figs. 9 and 10, carries draft eyes 8, retaining eyes or lugs 9 and locking lug 10, with the draft thumb-bolt movably inclosed therein; and a spring, shown in dotted lines, lies between the said parts and the hame, with one end thereof pressing the thumb-bolt and the other end thereof pressing the hames-shaft connector, O. The thumb-bolt is simply turned, lifted, lowered and turned back again for attaching and detaching the shaft trace, and all substantially as illustrated. Said lugs 9 and 10, are shown dotted in the end view of Fig. 10, to illustrate the shape of the device when cast. The spring is shown engaging a flat depression in the draft bolt to prevent its automatically turning out of locking relations; and the spring engages a similar depression in the bolt to prevent its rising when out of said locking engagement with lug 10. The shaft tip device, R, shown in Fig. 9, bolted to the end of the shaft, is of special design for wooden shafts; it consists of an underlying plate having a draft pivot lug, 11, thereon, designed to fit in an auger socket therefor in the shaft for draft purposes, and having side lugs, 12, designed to clamp the sides of the shaft to prevent splitting, and to give side strength, and having a screw threaded tip or end, shown partly broken away, designed to carry the draft sleeve and to be long or short for adjusting the length of the shaft at pleasure. The draft tip, S, shown mounted on the end of the whiffletree in Fig. 9, is also of special design, which may be cast without a coring, and be quickly and easily mounted on the tree. As shown, it has a pair of side arms tied together by cross-bars above and below the tree socket formed thereby, and in which the lower cross-bars vertically intervene the upper cross-bars, so as not to interfere in casting without a coring. Preferably, the draft end thereof is shown cylindrical and screw-threaded for vertical hinge relations with the shaft trace, for adjusting the length of the tree, for attachment to and detachment from the draft sleeve thereon carried by the shaft trace, and for quick, easy and secure application to various kinds of draft attachments. The cross-bar-yoke $A^2$, of Fig. 9 simply illustrates a modified cross-bar-yoke substantially semi-circular, and with but one vehicle connection. And the tree connection, G, therewith is like the others shown, but the locking plate is shown secured by a simple thumb bolt, 13.

The cross-bar-yoke, $A^3$, illustrated in Fig. 16, is specially designed for use where the cross-bar portion thereof forms a fixed part of the gearing of the vehicle. Hence, the arm portion, T, thereof, is pivotally hinged to the end of the cross-bar with provision for both vertical and lateral movements relative to the cross-bar. And an arm brace-connector, U, which is also pivoted to the cross-bar near its center, is secured to the free end of the yoke arm T, to control the side movements thereof and to adjust the angular relations of the arm to the cross-bar. Preferably, the arm brace connector is shown divided and its parts connected together by screw threads for adjusting the length thereof, and thereby adjusting the distance between the tips of the shafts. Special provisions are made for attaching this yoke to the shaft traces similar to those found in other figures, and also special provision is made for rigidly securing the yoke arm to a common shaft by means of bolts; extra bolt holes being provided in the said arms for this purpose in connection with the other sockets therein.

Cross-bar yoke, $A^4$, illustrated in Fig. 17, is also of special design; and in which the yoke arm, T', and arm brace, U', correspond to those shown in Fig. 16, but are shown limited to lateral movement relative to the cross-bar. One end of one of the arm-braces is shown detached and turned sidewise to indicate means for detachment. A simple leather pin in the socket shown in the detached end, being sufficient to secure the parts together; but for rigidly securing the arm to a common shaft, as set forth above under Fig. 16, or to a connector, such as C illustrated in Fig. 1, the end is shown, in dotted lines, to be extended and nutted. Thus these cross-bar-yokes are specially adapted and designed for both common and combination shafts. Fig. 17 also illustrates a simple cross-bar mounted at each end with a connector, V, for hinging the shafts to a vehicle. Preferably, the connector, V, is shown underlying the end of the cross-bar and clamping the sides thereof with a pair of jaws, and rigidly bolted thereto. Preferably a series of bolt holes is provided in the connector, V, for adjusting the length of the cross-bar to suit vehicles of various widths. The connector, V, and the arm, T', are preferably shown secured to the cross-bar by a single bolt. And the same bolt lengthened is designed to also aid in rigidly securing the arm to a common shaft when used in common shafts. Thus a very simple cross-bar-yoke is provided of easy manufacture and manipulation.

In Fig. 18, a divided arm brace is shown with one part carrying a pair of socketed lugs, and the other part carrying a screw threaded portion within, and a nut thereon engaging, the said socketed lugs, with provisions for adjusting the length of the arm brace by turning the nut, and means for securing the nut against automatic turning, consisting of a simple wedge, preferably of leather, 14, shown broken away in section.

Two other applications for combination shafts, companion with this, are filed of even date herewith: the one being serial number next preceding this and the other next following this. And also a companion application for "Means for detachably and interchangeably connecting common and shaft traces to hames or other parts of a harness," was filed May 29—1907. Serial No. 376,273.

While I have preferably shown the shaft connections with the cross-bar-yoke in front of the connection with the shaft, yet it is obvious that such connections may as well be in the rear, or that two such connections may be used, the one in front and the other in the rear of the tree connection without departure from the invention. Moreover, it is clearly evident that the several parts of the invention may be constructed of various shapes and styles, and some of them even omitted, without departure from the spirit of the invention. It is therefore understood that I am not limited to the exact illustrative styles shown and described herein.

I claim—

1. The combination, in combination shafts, of a cross-bar-yoke, means for securing the same to a vehicle, a whiffletree centrally pivoted to the center of the cross-bar-yoke, and a pair of shaft traces connected with the ends of the cross-bar-yoke respectively and movable endwise relative thereto and also connected with the ends of the whiffletree respectively and movable hingedly with lateral flexibility relative thereto.

2. The combination, in combination shafts, of a cross-bar-yoke, means for securing the same to a vehicle, a whiffletree centrally pivoted to the center of the cross-bar-yoke, and a pair of shaft traces connected with the ends of the cross-bar-yoke respectively and movable endwise relative thereto and also connected with the ends of the whiffletree respectively and movable hingedly with lateral and vertical flexibility relative thereto.

3. The combination, in combination shafts, of a cross-bar-yoke, means for securing the same to a vehicle, a whiffletree centrally pivoted to the center of the cross-bar-yoke and a pair of shaft traces hingedly connected with the ends of the whiffletree and cross-bar-yoke respectively.

4. The combination, in combination shafts, of a cross-bar yoke, means for securing the same to a vehicle, a whiffletree centrally pivoted to the center of the cross-bar-yoke, a whiffle-breast-yoke-element and a pair of shaft traces connected with the ends of the whiffle-breast-yoke-element, the cross-bar-yoke and the whiffletree respectively and movable endwise relative to the cross-bar-yoke and hingedly with lateral flexibility relative to the whiffle-breast-yoke-element and whiffletree.

5. The combination, in combination shafts, of a cross-bar-yoke, means for securing the same to a vehicle, a whiffletree centrally pivoted to the center of the cross-bar-yoke, a whiffle-breast-yoke element, and a pair of shaft traces detachably connected with the breast-yoke element and connected with the cross-bar-yoke and movable endwise relative thereto and also connected, with lateral flexibility, to the whiffletree.

6. A pair of combination shafts, comprising a cross-bar-yoke, means for securing the same to a vehicle, a whiffletree centrally pivoted to the center of the cross-bar-yoke, and a pair of shaft traces each connected with the cross-bar-yoke and movable endwise relative thereto and each hinged with lateral flexibility to the whiffletree, and means for securing each shaft trace to the harness.

7. A pair of combination shafts comprising a cross-bar-yoke, means for securing the same to a vehicle, a whiffletree centrally pivoted to the center of the cross-bar-yoke, a whiffle-breast-yoke-element, and a pair of shaft traces each connected with the cross-bar-yoke and movable endwise relative thereto and each hinged with lateral flexibility to the whiffle-breast-yoke-element and to the whiffletree, and means for securing the combination shafts to the harness.

8. A pair of combination shafts comprising a cross-bar-yoke, means for securing the same to a vehicle, a whiffletree centrally pivoted to the center of the cross-bar-yoke, a whiffle-breast-yoke-element, and a pair of shaft traces each connected with the cross-bar-yoke and movable endwise relative thereto, and each hinged with lateral flexibility to the whiffle-breast-yoke-element and to the whiffletree, the whiffle-breast-yoke-element being detachable from one or both of the shaft traces for the purpose specified.

9. In combination shafts, the combination of a cross-bar-yoke, means for securing the same to a vehicle, a whiffletree centrally pivoted to the center of the cross-bar-yoke, a whiffle-breast-yoke element, and a pair of shaft traces detachably connected to the whiffle-breast-yoke element, the cross-bar-yoke and the whiffletree respectively and movable endwise relative to the cross-bar-yoke and with the whiffle-breast-yoke element and the whiffletree; and all arranged for the coöperative purposes set forth.

10. The combination, in a pair of shafts with a whiffletree and a pair of side shaft members, of a cross-bar-yoke comprising a cross-bar provided with means for securing the center thereof to the whiffletree, a pair of rearwardly projecting draft devices rigidly mounted on the ends of the cross-bar respectively and provided with means for attachment to a vehicle, a pair of arms pivotally secured to the ends of the cross-bar respectively and each having a forwardly projecting end and movable laterally relative to the cross-bar, and a pair of arm braces each having an end connected with the cross-bar and an end connected with the forward end of one of the arms, and means for securing the side shaft members respectively to the arms, substantially as and for the purposes specified.

11. In a pair of shafts, the combination, with a whiffletree and a pair of side shaft members, of a cross-bar-yoke comprising a cross-bar, a pair of forwardly projecting arms pivotally secured to the ends of the cross-bar respectively and movable laterally relative thereto, and a pair of arm braces each having one end thereof connected with the cross bar and the other end thereof connected with the forward end of one of the arms, means for securing the side shaft members respectively to the arms and means for securing the cross-bar-yoke to the whiffletree and to a vehicle.

12. In a pair of shafts, the combination, with a whiffletree and a pair of side shaft members, of a cross-bar-yoke comprising a cross-bar, a pair of forwardly projecting arms pivotally secured to the ends of the cross-bar respectively and movable laterally relative thereto, a pair of arm braces adjustable in length and each having one end thereof connected with the cross-bar and the other end thereof connected with the forward end of one of the arms with provision for adjusting the angular relations of the cross-bar yoke, means for securing the side shaft members respectively to the arms, and means for securing the cross-bar-yoke to the whiffletree and to a vehicle.

13. In a pair of shafts, the combination, with a cross-bar-yoke having a forwardly projecting arm portion secured thereto, and a shaft secured to the arm of a divided arm-brace, 14, adjustable in length and composed of a portion carrying a pair of socketed lugs thereon and a screw threaded bolt portion engaging within the sockets of said lugs and carrying a nut thereon between and engaging said lugs, with provision for adjusting the length of the arm brace by turning the nut, means for locking the nut against automatic turning, means for securing one end of the arm brace to the cross-bar and means for securing the other end thereof to the forward end of the arm portion, substantially as and for the purposes specified.

14. In a pair of shafts, the combination, in a cross-bar-yoke having a forwardly projecting arm secured to the end of the cross-bar, of a draft device provided with a draft groove or channel therein into which the end of the cross-bar is closely fitted and rigidly secured thereto by a bolt, the draft device being also provided with a rearward projection and means thereon for attachment to a vehicle, substantially as and for the purposes specified.

15. In combination shafts, the combination, with a shaft trace and a cross-bar-yoke, of means engaging the shaft trace and projecting to the side thereof, means pivotally engaging the cross-bar-yoke, and projecting to the side thereof, and a connector provided with sockets therein engaging the said side projections and thereby hingedly connecting the shaft trace to the cross-bar-yoke, so that the shaft trace is movable endwise relative to the cross-bar-yoke, substantially as and for the purposes set forth.

16. In combination shafts, the combination, with a shaft trace and a cross-bar-yoke, of means engaging the shaft trace and projecting to the side thereof, means pivotally engaging the cross-bar-yoke and movable laterally relative thereto and also projecting to the side thereof, and a connector provided with sockets therein engaging said side projection, the arrangement being such that the shaft trace is hingedly secured to the cross bar yoke and movable endwise relative thereto, and also movable pivotally relative to the cross-bar-yoke, with allowance for adjusting the distance between the tips of the shafts, substantially as and for the purposes specified.

17. In combination shafts, the combination, with a shaft-tree and a cross-bar-yoke, of a connector provided with screw-threaded sockets therein, means pivotally engaging a socket in the connector by corresponding screw-threaded parts and also engaging the shaft trace, and means pivotally engaging a socket in the connector by corresponding screw-threaded parts and also engaging the cross-bar-yoke, and all arranged so that the shaft trace is hinged to the cross-bar-yoke and movable endwise thereto.

18. In combination shafts, the combination, with a pair of shaft traces, of a whiffle-breast-yoke-element hinged to the shaft traces respectively and movable like a whiffle tree forward and back with and relative to the shaft traces, substantially as and for the purposes specified.

19. In combination shafts, the combination, with a pair of shaft traces, of a whiffle-breast-yoke-element detachably hinged to the shaft traces respectively and movable like a whiffletree forward and back with and relative to the shaft traces substantially as and for the purposes specified.

20. In combination shafts, the combination, with a pair of shaft traces, of a whifflebreast-yoke-element adjustable in length and detachably hinged to the shaft traces respectively and movable like a whiffletree therewith and relative thereto, substantially as and for the purposes specified.

21. In combination shafts, the combination, with a pair of shaft traces, of a whiffle-breast-yoke-element adjustable in length and comprising a pair of side members hinged to the shaft traces respectively and movable like a whiffletree therewith and relative thereto, and detachable from one or both of the shaft traces, and a central member connecting the said side members together by coöperating screw threaded parts by which the length of the whiffle-breast-yoke-element may be adjusted, substantially as and for the purposes set forth.

22. In combination shafts, the combination, with a pair of shaft traces, of a T-shaped whiffle-breast-yoke element hinged to the shaft traces respectively and movable like a whiffletree therewith and relative thereto, and a socket in the lower end of the T, substantially as and for the purposes specified.

23. In combination shafts, the combination, with a pair of shaft traces and a breast-strap, of a whiffle-breast-yoke element hinged to the shaft traces respectively and movable like a whiffletree therewith and relative thereto, and also having an end portion rearwardly projecting from the hinged connection with the shaft trace, and provided with means for attaching the breast strap thereto, substantially as and for the purposes specified.

24. In combination shafts, the combination, with a whiffle-breast-yoke-element and a shaft trace, of a detachable hinged connection comprising a vertically disposed projection on the shaft trace having an annular groove therein, and a vertically disposed socket in the whiffle-breast-yoke-element engaging the projection on the shaft trace, and means retentively engaging the annular groove in the projection on the shaft trace, and securing the projection within the socket of the whiffle-breast-yoke-element, substantially as and for the purposes specified.

25. In combination shafts, the combination, with a whiffle-breast-yoke-element and a shaft trace, of a detachable hinged connection comprising a vertically disposed projection on the shaft with an annular groove therein and a vertically disposed socket in the whiffle-breast-yoke-element, engaging the projection on the shaft trace, a spring-pressed locking latch having one end thereof pivoted to the whiffle-breast-yoke-element and the other end thereof retentively engaging the annular groove in the projection on the shaft trace, and detachably securing the projection on the shaft within the socket of the whiffle-breast-yoke-element.

26. In combination shafts, the combination, with a cross-bar yoke and a whiffletree, of a device having a bolt projection thereon with an annular groove in the bolt and a device carrying a socket therein engaging the bolt projection and also carrying a spring-pressed locking latch detachably engaging the annular groove in the bolt projection and lockingly securing the said devices together, means for securing one of the devices to the center of the cross-bar yoke and means for securing the other device to the center of the whiffletree for detachably securing the tree to the cross-bar.

27. In combination shafts, the combination of a whiffletree provided centrally with a bolt projection thereon having an annular groove therein, and a cross-bar yoke provided centrally with a socket engaging the bolt projection, and means engaging the annular groove of the bolt projection and lockingly securing the tree to the cross-bar.

28. In combination shafts, the combination of a whiffletree provided centrally with a projection thereon having an annular groove therein and a cross-bar yoke provided centrally with a socket engaging the projection, and a locking latch detachably engaging the annular groove in the tree projection and lockingly securing the tree to the cross-bar, and a spring adjustment detachably securing the locking latch within the said annular groove.

29. In combination shafts, the combination of a whiffletree and a shaft hingedly connected to the end of the whiffletree by a vertically disposed pivot joint and movable laterally therewith and relative thereto.

30. In combination shafts, the combination, with a whiffletree and a shaft of a compound double-jointed connection having a vertically disposed pivot joint and also a laterally disposed pivot joint hingedly securing the end of the whiffletree to the shaft.

31. In combination shafts, the combination, with a whiffletree and a shaft trace, of a pair of draft devices pivotally connected together by corresponding screw-threaded parts, means securing one of said draft devices to the shaft with lateral flexibility relative thereto, and means securing the other draft device to the end of the whiffletree.

32. In combination shafts, the combination, with a whiffletree and a shaft, of a draft device pivotally secured to the shaft and movable laterally relative thereto, and means securing the draft device to the end of the whiffletree.

33. In combination shafts, the combination of a whiffletree having its end screw threaded and a shaft provided with a draft device pivoted thereto with a screw-threaded socket therein detachably engaging the screw-threaded end of the whiffletree, with provision for adjusting the length of the whiffletree and also for detaching the tree from the shaft by a rotary movement of the whiffletree relative to the shaft.

34. In combination shafts, the combination, with a whiffletree and a shaft, of a compound connecting device hinged to the shaft by a vertically disposed pivot joint and hinged to the end of the whiffletree by a laterally disposed pivot joint.

35. In combination shafts, the combination, with a whiffletree and a shaft trace, of a looped draft device, a U-shaped clevis connector within and secured to the loop, a tree connector pivotally secured within the ends of the clevis connector, means for securing the looped draft-device to the shaft, and means for securing the tree connector to the whiffletree.

36. In combination shafts, in combination with a whiffletree, of a shaft trace having its rear end mounted with a draft loop, a shaft connector within and secured to the loop, a tree connector pivotally secured to the shaft connector, and means for securing the tree connector to the end of the whiffletree substantially as and for the purposes specified.

37. In combination shafts, the combination, with a whiffletree and a shaft trace, of a U-shaped clevis connector having a draft device pivotally secured within the ends thereof, means for securing the clevis connector to the shaft and means for securing the draft device to the end of the whiffletree, substantially as and for the purposes specified.

38. In combination shafts, the combination, with a shaft trace, and a companion draft member, of a compound, double-jointed connection hingedly securing the shaft to the companion draft member, said joints being the one pivotally transverse the other.

39. In combination shafts, the combination with a shaft trace and a companion draft member, of a compound, triple-jointed connection hingedly securing the shaft to the companion draft member, said joints being each pivotally transverse the other two.

40. In combination shafts, the combination, with a shaft trace and a companion draft member, of a compound, quadruple jointed connection rockingly hinging the shaft to the companion draft member, two of said joints being substantially parallel the one to the other, and pivotally transverse each of the other two.

41. In combination shafts, the combination, with a shaft trace and a breast-yoke element, of a single compound, double-jointed connection hingedly securing the shaft trace to the breast yoke element, the joints of said connection being the one pivotally transverse the other.

42. In combination shafts, the combination, with the shaft and cross-bar-yoke, of a compound connection comprising a connecting device, means for securing one end thereof to the shaft by a lateral pivotal joint transversely disposed to the shaft and means for securing the other end thereof to the cross-bar-yoke by a lateral pivotal joint, said pivot joints being substantially parallel the one to the other with provision for the shaft to hingedly move endwise relative to the cross-bar-yoke upon said pivot joints, substantially as and for the purposes specified.

43. In combination shafts, the combination, with a companion draft member, of a shaft trace provided with a bolt-like screw-threaded cylindrical draft end and a draft device provided with a correspondingly screw-threaded socket therein coöperatively engaging the draft end of the shaft trace, and means for securing the draft device to the companion draft harness member.

44. In combination shafts, the combination with a companion draft member, of a shaft trace provided with an extended bolt-like screw-threaded cylindrical draft end and a draft device provided with a correspondingly screw-threaded socket therein coöperatively engaging the draft end of the shaft-trace, for adjusting the draft length of the shaft trace, and means for securing the draft device to the companion draft member.

45. In combination shafts, the combination with a cross-bar-yoke, of a whiffletree having its end screw threaded and a shaft trace provided with a draft device pivoted thereto and with a screw-threaded socket in the draft device engaging the screw-threaded end of the whiffletree, and means detachably securing the center of the whiffletree to the center of the cross-bar-yoke.

46. In combination shafts, the combination, with a cross-bar yoke and a shaft trace, of a whiffletree secured to the shaft trace with lateral flexibility relative thereto, and means detachably securing the center of the whiffletree to the center of the cross-bar-yoke.

47. In combination shafts, the shaft trace provided near its forward end with a hinged joint therein hingedly movable in a vertical plane only and with provision for the jointed end of the shaft to automatically move to a lower plane in holding back and to return in forward draft, and means for hingedly securing the forward end of the shaft trace to a hame or collar or other harness member.

48. In combination shafts, the combination, with a shaft trace and a whiffletree, of a draft device having a socket therein, said socket being composed of side arms connected together by cross-bars above and below said side arms and with the upper cross-bars substantially intermediate the lower cross-bars, so as to allow of casting the draft device without the use of a core, means for securing the end of the whiffletree within the socket of the draft device and means for securing the shaft trace to the draft device with lateral flexibility relative thereto, substantially as and for the purposes set forth.

49. In combination shafts, the combination, with a shaft trace and a whiffletree, of a draft device having a socket therein, said socket being composed of side arms connected together by cross-bars above and below said arms, with the upper cross-bars substantially intermediate the lower cross-bars and with one or more of said cross bars having one or more rivet holes therein; the arrangement being such that the draft device may be cast complete without the use of a core, means for securing the end of the whiffletree within the said socket of the draft device and means for securing the shaft trace to the draft device with lateral flexibility relative thereto, substantially as and for the purpose set forth.

J. HAYS ALLIN.

Witnesses:
A. W. ALLEN,
ANNA ALLIN ALLEN.

Copies of this patent may be obtained for five cents each, by addressing the "Commissioner of Patents, Washington, D. C."